US011740962B2

(12) United States Patent
Fowler

(10) Patent No.: US 11,740,962 B2
(45) Date of Patent: *Aug. 29, 2023

(54) QUANTUM ERROR CORRECTION

(71) Applicant: Google LLC, Mountain View, CA (US)

(72) Inventor: Austin Greig Fowler, Reseda, CA (US)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/819,522

(22) Filed: Aug. 12, 2022

(65) Prior Publication Data

US 2022/0382626 A1 Dec. 1, 2022

Related U.S. Application Data

(63) Continuation of application No. 16/645,776, filed as application No. PCT/US2017/051290 on Sep. 13, 2017, now Pat. No. 11,449,385.

(51) Int. Cl.
| | | |
|---|---|---|
| *H03M 13/00* | (2006.01) | |
| *G06F 11/10* | (2006.01) | |
| *G06N 10/00* | (2022.01) | |
| *G06F 15/16* | (2006.01) | |
| *G06N 10/70* | (2022.01) | |

(52) U.S. Cl.
CPC .......... *G06F 11/1044* (2013.01); *G06F 15/16* (2013.01); *G06N 10/00* (2019.01); *G06N 10/70* (2022.01)

(58) Field of Classification Search
CPC ...... G06N 10/00; G06F 15/16; G06F 11/1044
See application file for complete search history.

(56) References Cited

U.S. PATENT DOCUMENTS

| | | | |
|---|---|---|---|
| 7,875,876 B1 | 1/2011 | Wandzura et al. | |
| 11,449,385 B2* | 9/2022 | Fowler | G06N 10/00 |
| 2010/0106913 A1 | 4/2010 | Kiyota | |
| 2010/0251049 A1 | 9/2010 | Goto et al. | |
| 2014/0089593 A1 | 3/2014 | Vera et al. | |
| 2016/0267032 A1 | 9/2016 | Rigetti et al. | |

(Continued)

FOREIGN PATENT DOCUMENTS

| | | |
|---|---|---|
| AU | 2015252050 | 5/2016 |
| JP | 2015210616 A | 11/2015 |
| WO | WO 2008155833 A1 | 12/2008 |

(Continued)

OTHER PUBLICATIONS

AU Office Action in Australian Application No. 2017431392, dated Jan. 7, 2021, 3 pages.

(Continued)

*Primary Examiner* — Samir W Rizk
(74) *Attorney, Agent, or Firm* — Fish & Richardson P.C.

(57) ABSTRACT

Apparatus for quantum error correction is disclosed. The apparatus includes an array of processing cores, each processing core comprising: a processor on a first chip; and a processor cache on the first chip; and a bus for interconnecting neighbouring processing cores in the array of processing cores; wherein each processing core includes: control code which, when executed by the processor, causes the processor to access a processor cache of at least one neighbouring processing core.

7 Claims, 8 Drawing Sheets

(56) References Cited

U.S. PATENT DOCUMENTS

Figure 1:
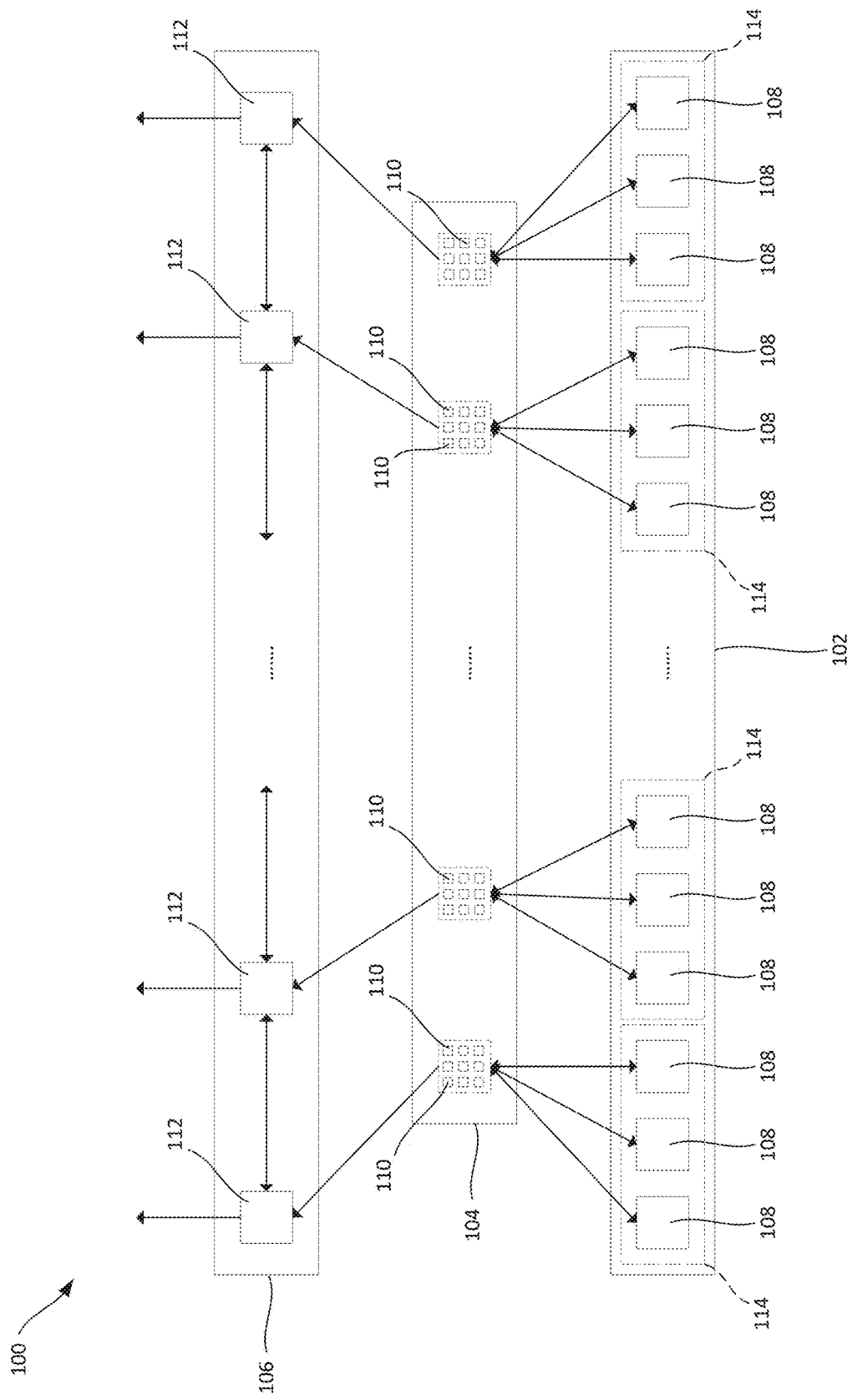

2017/0005255 A1 1/2017 Dial et al.
2017/0351967 A1 12/2017 Babbush et al.

FOREIGN PATENT DOCUMENTS

| WO | WO 2013101123 | 7/2013 |
| WO | WO 2015178990 | 11/2015 |
| WO | WO 2017001951 A1 | 1/2017 |
| WO | WO 2017103694 A1 | 6/2017 |
| WO | WO 2017209791 A1 | 12/2017 |

OTHER PUBLICATIONS

CA Office Action in Canadian Application No. 3,075,163, dated May 19, 2021 4 pages.

Fowler et al., "Towards practical classical processing for the surface code: timing analysis", arXiv: 1202,5602v2, Oct. 2012, 13 pages.

Fowler et al., "Towards practical classical processing for the surface code," arXiv, May 2, 2012, 5 pages.

International Search Report and Written Opinion in International Application No. PCT/US2017/051290, dated May 30, 2018, 16 pages.

KR Office Action in Korean Appln. No. 10-2020-7010698, dated Nov. 17, 2022, 21 pages (with English Translation).

Paler et al., "Synthesis of Arbitrary Quantum Circuits to Topological Assembly Systematic" Scientific Reports, Sep. 2017, 16 pages.

Tokunaga, "Quantum Computers: 3. Error Correction Technology of Quantum Computers—Topological Surface Codes in Accordance with Physics," Journal of Information Processing, Jun. 15, 2014, 55(7):695-701 (with English Abstract).

Office Action in Australian Appln. No. 2022203842, dated Mar. 28, 2023, 2 pages.

Office Action in Chinese Appln. No. 201780094876.9, dated Mar. 31, 2023, 14 pages (with partial English translation).

Office Action in Korean Appln. No. 10-2020-7010698, dated May 12, 2023, 6 pages (with English translation).

* cited by examiner

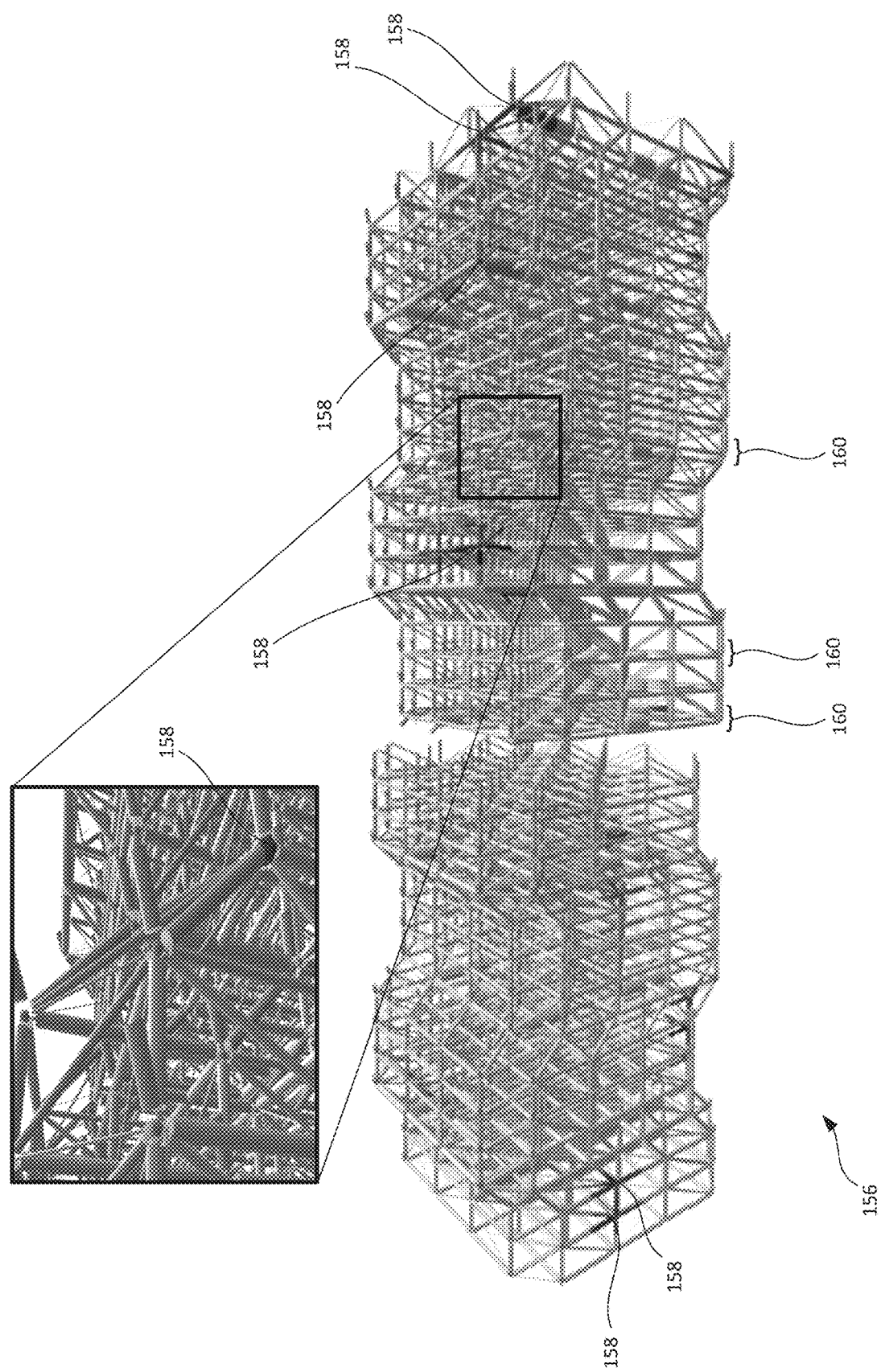

1

QUANTUM ERROR CORRECTION

CROSS-REFERENCE TO RELATED APPLICATION

This application is a continuation application of, and claims priority to, U.S. patent application Ser. No. 16/645,776, filed Mar. 9, 2020, which application is a National Stage Application under 35 U.S.C. § 371 and claims the benefit of International Application No. PCT/US2017/051290, filed Sep. 13, 2017. The disclosure of the foregoing applications are hereby incorporated by reference in their entirety.

FIELD

The present application relates to hardware for error correction in quantum computers. More particularly, the present application relates to a classical processing array for determining errors in a quantum computer.

BACKGROUND

Quantum computers are computing devices that exploit quantum superposition and entanglement to solve certain types of problem faster than a classical computer. The building blocks of a quantum computer are qubits. Qubits are two level systems whose state can be in a superposition of its two states, rather than just in either of the two states as is the case for a classical bit.

Quantum algorithms are algorithms that run on quantum computers. During the execution of these algorithms on a quantum computer, errors can be introduced from a number of sources including decoherence and noise. Due to the no-cloning theorem, classical error detection and correction techniques involving creating multiple copies of a state are unsuitable. Instead, quantum error detection and correction techniques involve entangling qubits with a number of other qubits, and performing measurements on a subset of the entangled qubits in order to identify when an error has occurred.

SUMMARY

In general, in some aspects, the subject matter of the present disclosure may be embodied in an apparatus comprising: an array of processing cores, each processing core comprising: a processor on a first chip; and a processor cache on the first chip; and a bus for interconnecting neighbouring processing cores in the array of processing cores; wherein each processing core includes: control code which, when executed by the processor, causes the processor to access a processor cache of at least one neighbouring processing core Implementations of the methods may include one or more of the following features. For example, in some implementations, the control code is stored in the processor cache.

In some implementations, the each processor cache comprises: first-level processor cache; and second-level processor cache, wherein data passes between the processor and the second-level processor cache via the first-level cache.

In some implementations, the control code is stored in the first level processor cache.

In some implementations, the controller code comprises machine code.

In some implementations the controller code, when executed by the processor, causes the processor to access the second-level processor cache of the at least one neighbouring processor core.

In some implementations, the processor cache comprises one or more buffers configured to store data accessed from the at least one neighbouring processing core.

In some implementations, the data accessed from the at least one neighbouring processing core is cyclically written to one or more of the buffers.

In some implementations, each processing core is arranged to receive a respective set of measurement data, to store the set of measurement data in the processor cache and to process the set of measurement data.

In some implementations, instructions for processing the measurement data are stored in the processor cache.

In some implementations, to process the set of measurement data, the processing core is configured to perform quantum error correction.

In some implementations, the quantum error correction comprises implementing a surface code.

In some implementations, to process the set of measurement data, the processing core is configured not to use random access memory.

In some implementations, the processor core further comprises one or more additional processors.

Further aspects of the present disclosure may be embodied in a system comprising: a first classical computing layer comprising an array of processing cores according to any preceding implementation; and a quantum computing layer comprising an array of quantum devices configured to implement a quantum computing algorithm, wherein the classical processing layer is configured to: receive measurement data from the quantum computing layer; and determine one or more errors in the quantum computing algorithm performed by the quantum computing layer using the received measurement data.

Further aspects of the present disclosure may be embodied in a system comprising: a first classical computing layer comprising an array of processing cores, each processing core comprising: a processor; and a processor cache; and a bus for interconnecting neighbouring processing cores in the array of processing cores; wherein each processing core includes: control code which, when executed by the processor, causes the processor to access a processor cache of at least one neighbouring processing core; a quantum computing layer comprising an array of quantum devices configured to implement a quantum computing algorithm, wherein the classical processing layer is configured to: receive measurement data from the quantum computing layer; and determine one or more errors in the quantum computing algorithm performed by the quantum computing layer using the received measurement data.

In some implementations, the system further comprises a control layer comprising an array of field-programmable gated arrays configured to: receive physical measurements from the quantum computing layer; convert the physical measurements to measurement data; and output the measurement data to the first classical computing layer.

In some implementations, the control layer is further configured to: receive quantum error correction instructions; and in response to receiving the quantum error correction instructions, cause the implementation of one or more qubit rotations on the quantum computing layer.

In some implementations, the system further comprises a second classical processing layer configured to: receive one or more determined errors in the quantum computing algorithm from the first classical computing layer; and determine one or more quantum error correction instructions from the one or more determined errors.

In some implementations, the second processing layer is further configured to cause the one or more quantum error correction instructions to be implemented in the quantum computing layer.

In some implementations, the second processing layer is configured to implement a surface code to determine the one or more quantum error correction instructions.

In some implementations, each processing core in the first classical processing layer receives measurements from a local patch of quantum devices in the quantum computing layer.

LIST OF FIGURES

Figure 2:
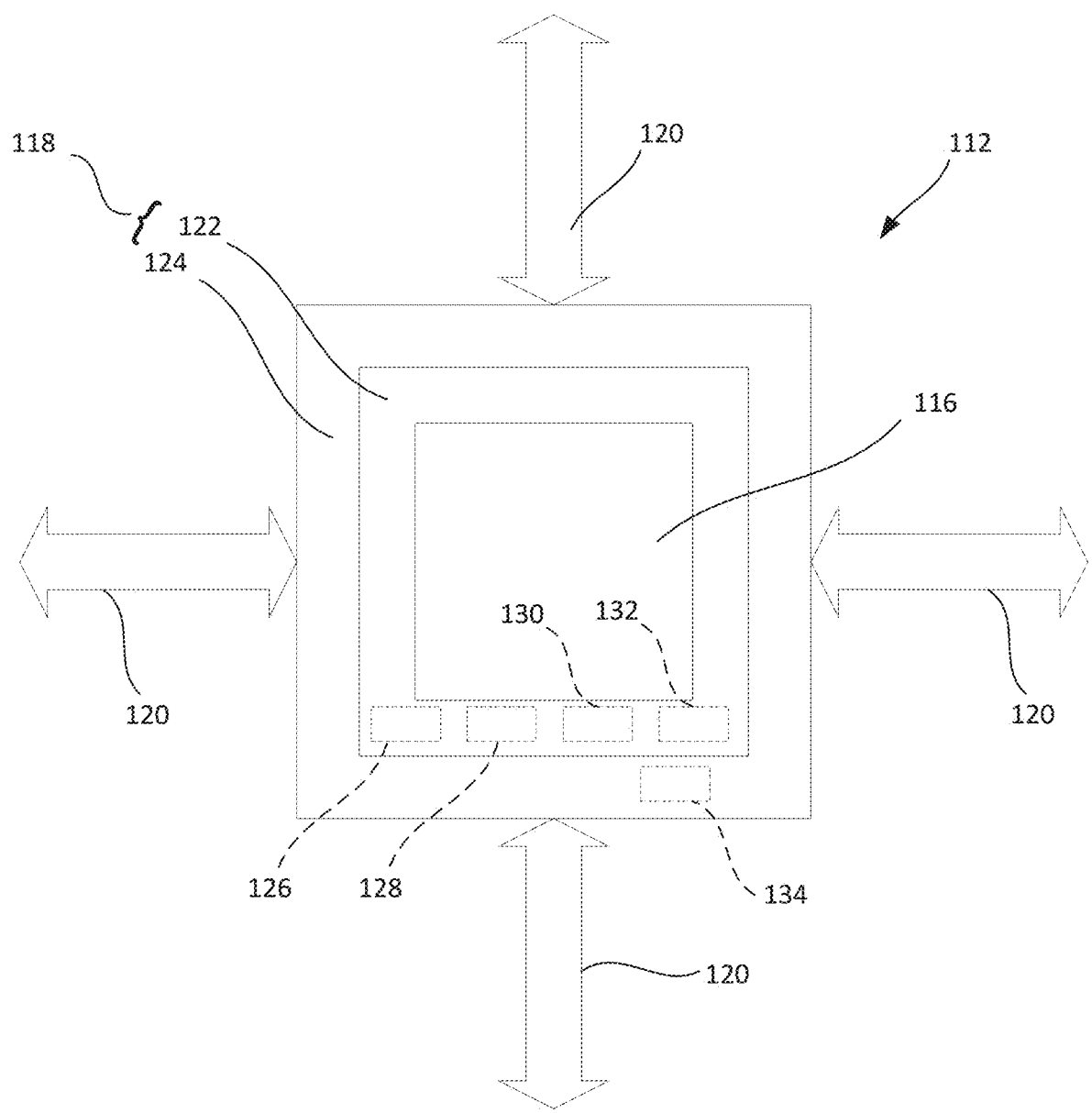
Figure 3:
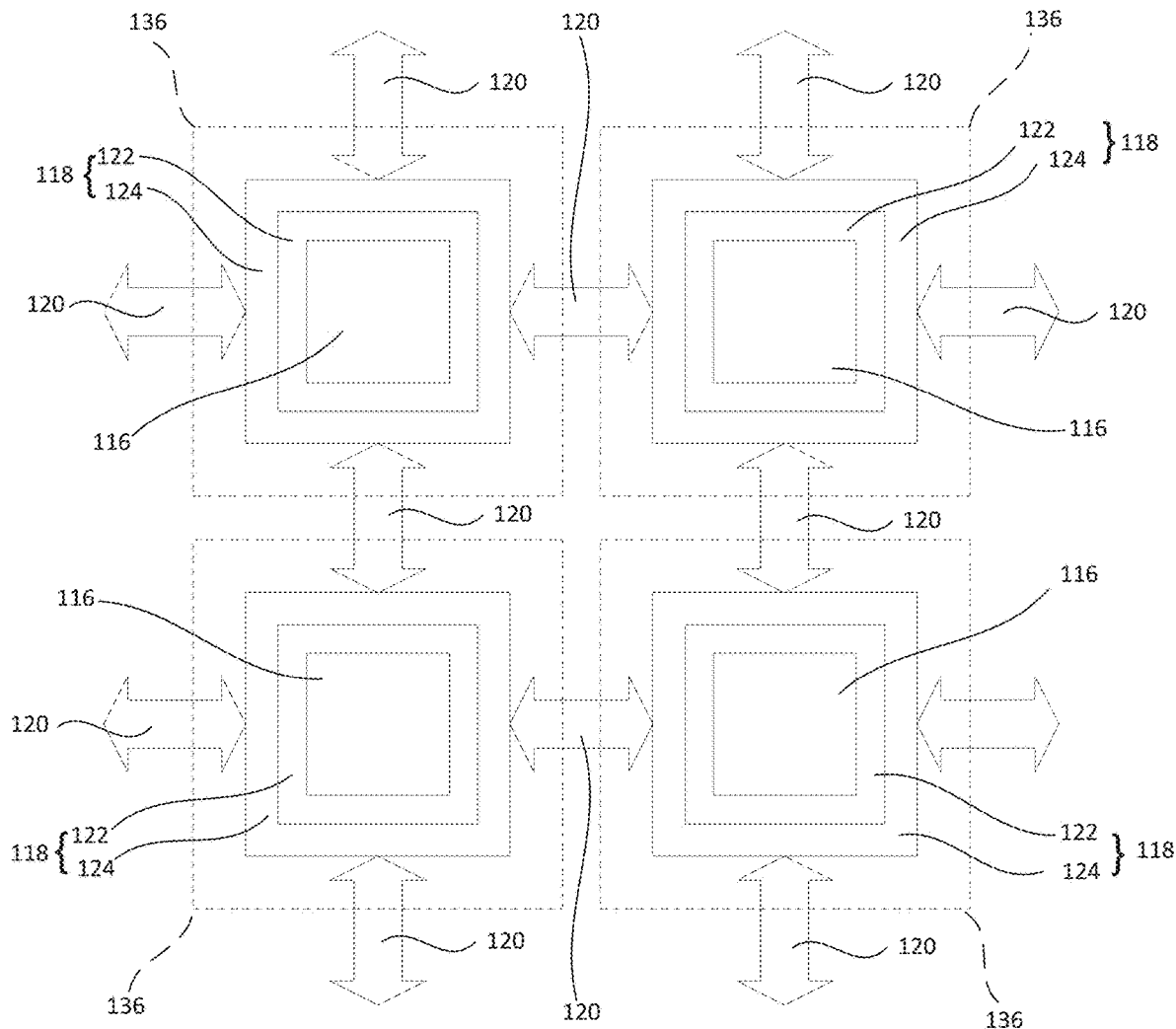
Figure 4:
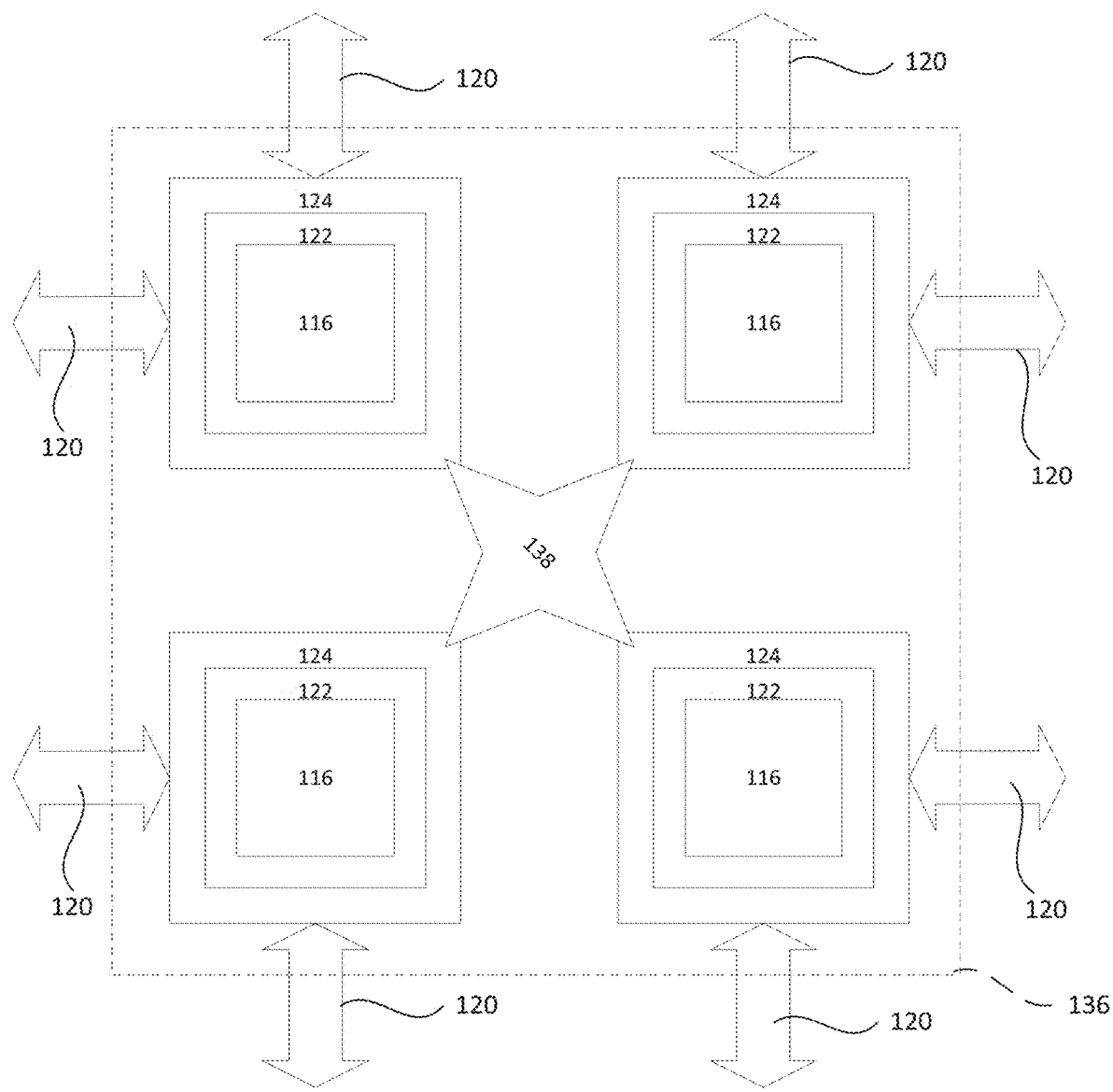
Figure 5:
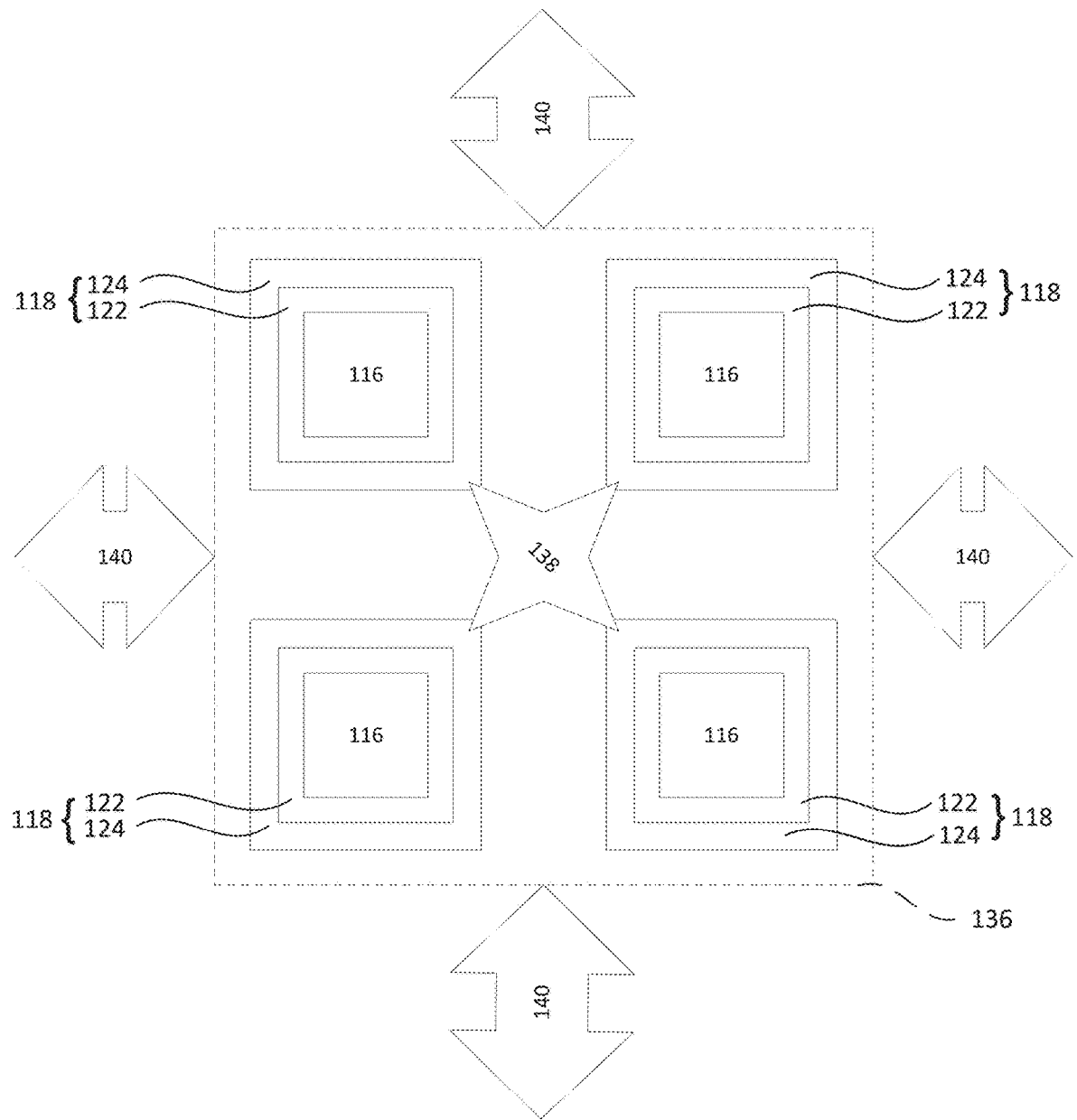
Figure 6:
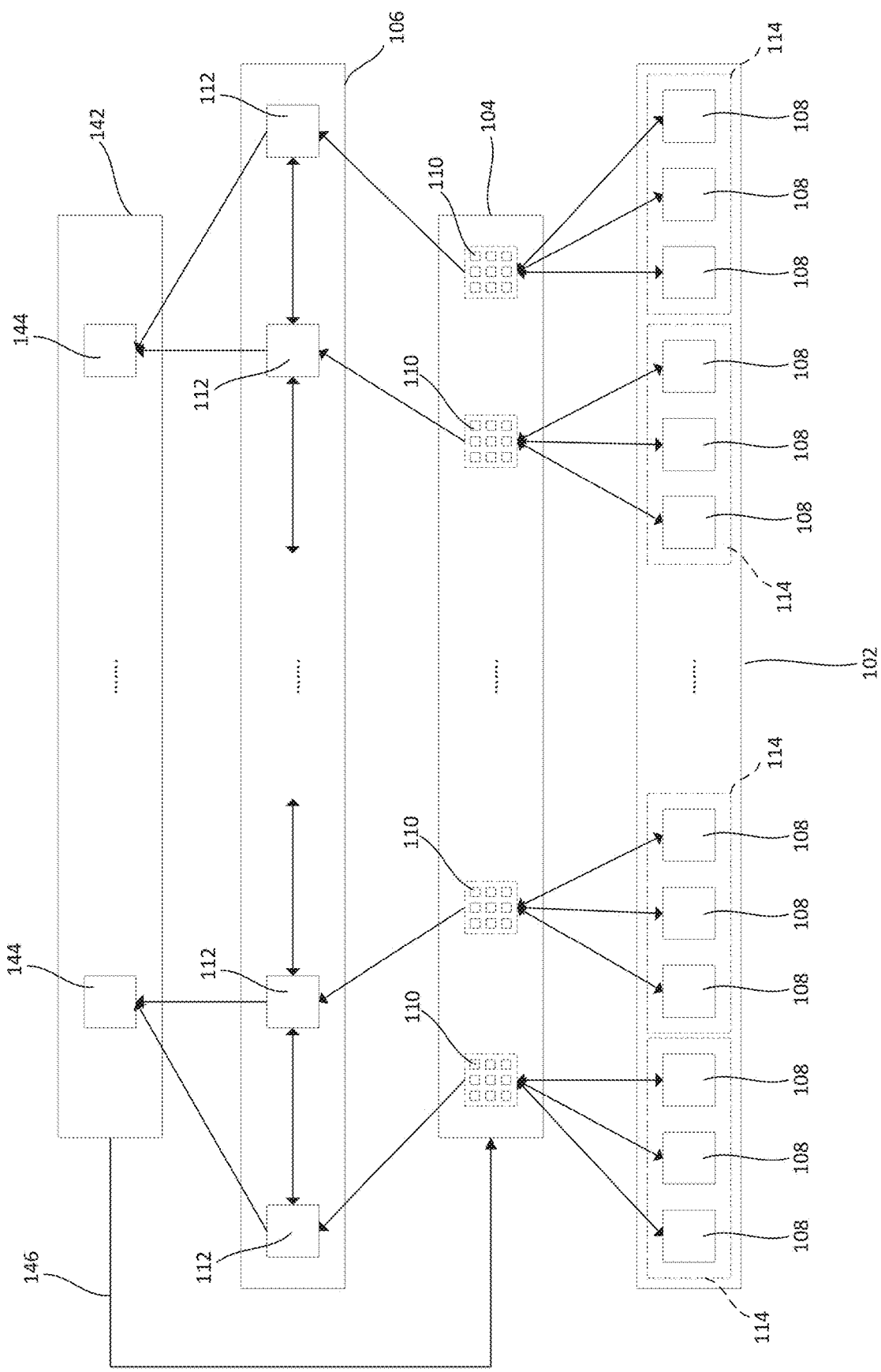
Figure 7:
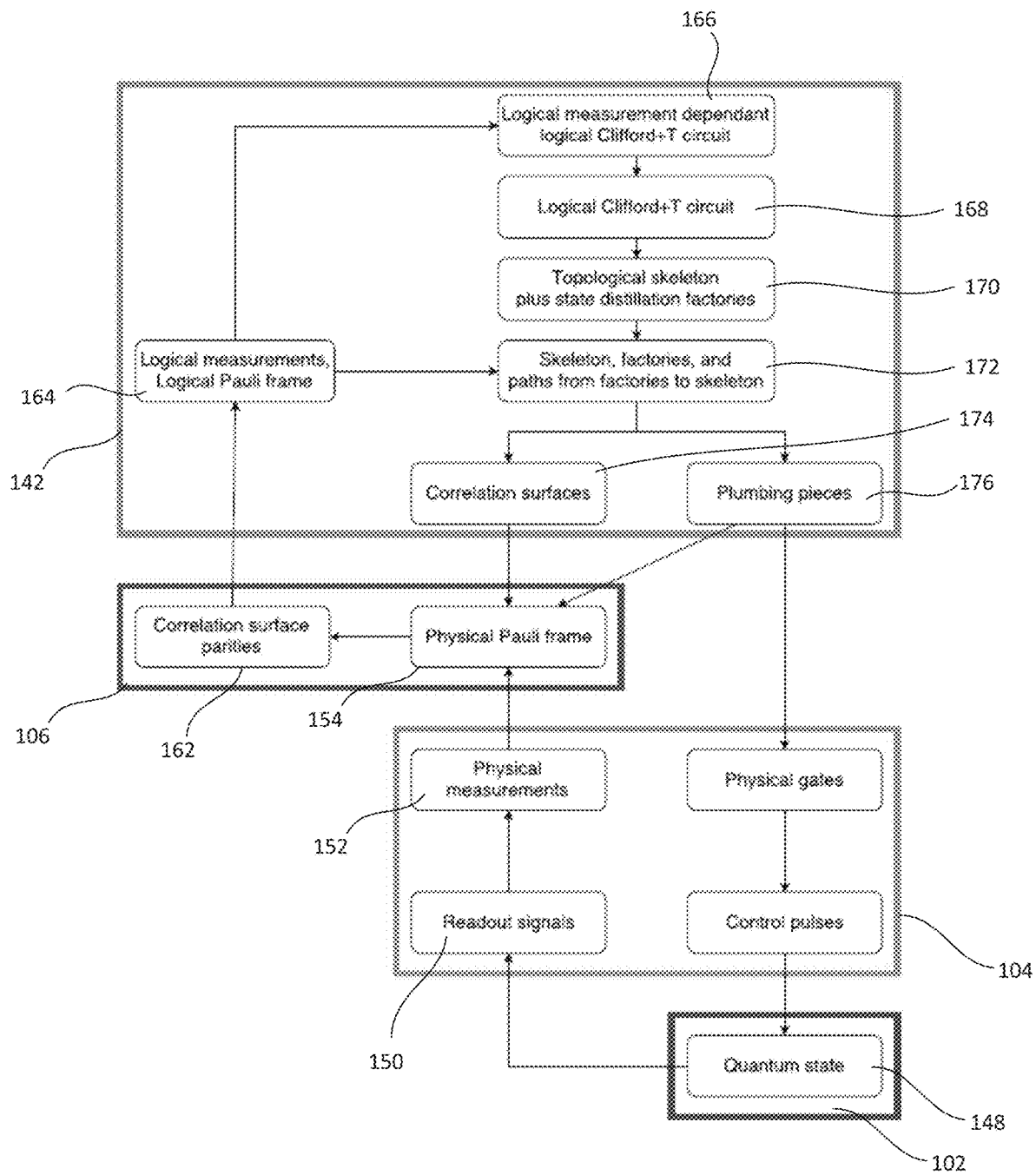

FIG. 1 shows a schematic example of an embodiment of a quantum computer;
FIG. 2 shows an example of a processing core for a classical processing layer;
FIG. 3 shows an example of a part of a classical processing array according to an embodiment;
FIG. 4 shows an example of multiple processor cores;
FIG. 5 shows a further example of multiple processor cores;
FIG. 6 shows a schematic example of a further embodiment of a quantum computer; and
FIG. 7 shows a schematic example of processes performed in a quantum computer according to an embodiment.
FIG. 8 shows an example three-dimensional data structure of an array representing a given local patch that is cyclically written to the processor cache of the processor core associated with that local patch.

DETAILED DESCRIPTION

FIG. 1 illustrates a schematic example of an embodiment of a quantum computer 100.

The quantum computer 100 comprises a quantum computing layer 102, a control layer 104 and a classical processing layer 106.

The quantum computing layer 102 comprises an array of quantum devices or qubits 108 configured to perform a quantum computing algorithm. The quantum devices or qubits 108 comprise a mixture of data qubits and syndrome (or measurement) qubits. The quantum computing layer 102 further comprises a plurality of quantum gates (not shown) for performing operations on the qubits 108. In some embodiments, the quantum computing layer is in the form of a two-dimensional array of quantum devices 108.

The quantum devices or qubits 108 can, for example, be superconducting qubits. The quantum computing layer 102 is kept at a sufficiently low temperature to maintain coherence between qubits throughout the execution of the quantum algorithm (for example, below 4.2K). In embodiments where superconducting qubits are used, the temperature is kept below the superconducting critical temperature. Herein, for the term "qubit" and "quantum device" will be used interchangeably.

A control layer 104 comprising a plurality of control devices 110 is interposed between the quantum computing layer 102 and the classical processing layer 106. The control devices 110 receive raw measurement data from qubits 108 in the quantum computing layer 102 and convert them into binary measurement data for use in the classical processing layer 106. The control devices 110 can, in some embodiments, also issue instructions to the quantum devices 108, for example to instruct a quantum gate (not shown) to perform a qubit rotation. In some embodiments, each control device 110 is connected to around six quantum devices 108. The control devices 110 are, in some embodiments, Field Programmable Gated Arrays (FPGAs).

The classical processing layer 106 (herein also referred to as "the first classical processing layer") comprises an array of processing cores 112. The processing cores 112 are described in further detail below in relation to FIG. 2. The classical processing layer 106 is coupled to the quantum computing layer 102 via the control layer 104. Processing cores 112 in the classical computing layer 106 are associated with local patches 114 of qubits 108. A local patch 114 comprises a plurality of qubits 108 grouped together. In some embodiments, the patch size is around one hundred qubits. Processing cores 112 in the classical processing layer 106 are coupled to neighbouring processing cores 112 in the classical processing layer 106. This can allow the processing cores 112 to exchange data with their neighbouring cores. In some embodiments, the processing cores 112 form a two-dimensional array of processing cores 112 within the classical processing layer 106.

The classical processing cores 112 are provided with dedicated assembly instructions, that, when executed by a processor in the processor core, cause the processor to access the processor cache of a neighbouring core. This can result in low latency communication between neighbouring cores, as a complex memory controller is not needed.

In use, the quantum computing layer 102 executes a quantum computing algorithm. Syndrome qubits in the quantum computing layer 102 interact with their neighbouring data qubits to produce raw measurement data. The raw measurement data is fed into the control devices 110 of the control layer 104. The control devices 110 convert the raw measurement data into binary measurement data and stream the binary measurement data into the processing cores 112 of the classical processing layer 106.

The classical processing layer 106 converts the binary measurement data from the control layer 104 into parities of the quantum states of qubits 108 in the quantum computing layer 102 that were measured. These parities are then processed by the classical processing layer 106 to determine any quantum errors and/or the required corrected parities for the quantum devices 108 in the quantum computing layer 102. The determined corrections can then be processed further to determine the required corrective action.

FIG. 2 shows an example of a processing core for the classical computing layer. Each processor core 112 of the classical processing layer 106 comprises a processor 116, one or more processor caches 118 and busses 120 to nearest-neighbour processing cores in the classical processing layer 106. Processing cores 112 are provided on a chip.

The busses 120 interconnect neighbouring processing cores 112 in the array of processing cores in the classical processing layer 106. The busses 120 allow a processor 116 to access the processor caches 118 of its nearest-neighbour processing cores 112 to obtain measurement data from local patches 114 of quantum devices 108 associated with neighbouring processing cores 112. Each processing core 112 is provided with control code 126 which, when executed by the processor 116, cause the processor 116 to access the processor cache 118 of at least one neighbouring processing core 112. The control code 126 is stored within the processor cache 118 to speed up access of the code by the processor 116. In some embodiments, the control code is in the form of machine code or assembly code.

The processor core 112 can be constructed to recognise the control code (for example in the form of assembly code) that can trigger direct access of the processor cache 118 of at least one neighbouring processor cores 112. For example, the processor core 112 can have an input/output circuitry that directly accesses the processor cache 118 of at least one or more similarly constructed processor cores. The processor core 112 is constructed to process corresponding assembly code instructions that are specific to the processing core to cause the direct access to the processing cache 118 of one or more neighbouring processor cores 112. Any appropriate processor fabrication techniques can be used to implement such circuitry.

The processor cores 112 can access data from processing cores 112 further away than their nearest neighbour processing cores. For example, next nearest or next-next nearest neighbour processing cores 112 can be accessed. This additional communication can be achieved in a number of ways. For example, the information at a particular coordinate can be requested by sending a request in the direction of that coordinate until it reaches the processor core 112 in charge of that coordinate. This processor core 112 can send the requested information back to the requester. Another example is having additional assembly level instructions for more than just the nearest four cores stored in the processing core.

The processor cache 118 further stores instructions for processing measurement data received by the processing core. These instructions comprise a quantum error correction and/or determination algorithm. In some examples the quantum error correction algorithm comprises a surface code, such as a Toric code for example. An example of a surface code is provided in "*Towards practical classical processing for the surface code: timing analysis*" by Fowler et al. [https://doi.org/10.1103/PhysRevLett.108.180501].

In some embodiments, the processor cache comprises an L1 cache 122 (herein also referred to as "a first-level cache") and an L2 cache 124 (herein also referred to as "a second-level cache").

The processor cores 112, constructed as described above, can process the instructions that trigger direct communication among the cache layers. In some implementations, the L1 cache is used to store the state of a quantum error correction process, and the L2 cache stores the instructions that implement quantum error correction process.

The L1 cache 122 comprises data 130 comprising the measurement data currently being processed by the processor 116.

The L2 cache 124 stores data comprising instructions 128 for performing a quantum error correction algorithm. The control code 126 for accessing neighbouring processing cores 112 is also stored in the L2 cache 124. Low level assembly instructions 132 are also used to move the measurement data between the L1 cache 122 and L2 cache 124 of a processing core 112. In some embodiments the low level assembly instructions 132 are provided as part of the control code 126. In other embodiments, the low level assembly instructions 132 are provided separately.

The L2 cache 124 also stores measurement data 134 obtained from quantum devices 108 in the local patch 114 that the processing core 112 is associated with. Measurement data 134 from the associated local patch 114 is fed from the quantum computing layer 102 into the L2 cache 124 via the control layer 104. The measurement data 134 is transferred to the processor 116 for processing via the L1 cache 122 as required. Each L2 cache 124 further comprises receive buffers (not shown) for each of the busses 120 of the processor core 112. The buffers are written to cyclically by the corresponding neighbouring processing core. The buffer can be configured to issue a "stop bit" to let other cores know that it is overloaded to reduce contention. The control code, when executed by the processor in such embodiments, can cause the processor to access the second-level processor cache 124 of a neighbouring processor core.

The use of the processor cache to store the algorithm instructions and measurement data can reduce or even remove the need for external memory, such as random access memory, when performing quantum error correction. This can help reduce latency when performing the error correction algorithm.

In some embodiments, the L1 cache has a memory of between 8 kB and 128 kB. In some embodiments, the L1 cache has a memory of 64 kB. In some embodiments, the L2 cache has a memory of between 0.5 MB and 3 MB. In some embodiments, the L2 cache has a memory of 1.5 MB.

An example of a part of an array using a single processing core per local patch is shown in FIG. 3.

The classical processing layer comprises an array of classical processing cores 112. The array comprises a plurality of motherboards 136, each comprising a processing core 112. In the example given, only four processing cores are shown, though in general the array can consist of any number of processing cores 112.

A processor core 112 is located on each motherboard 136 in the array. Processor caches 118 on neighbouring motherboards 136 are linked via the busses 120.

Each processing core 112 receives measurement data from a local patch 114 of quantum devices 108 in the quantum computing layer 102. Collectively the processing cores 112 in the array cover the local patches 114 of interest in the quantum computing layer 102. In some embodiments, the array covers all local patches 114 in the quantum computing layer 102.

During execution of a quantum error correction algorithm, the buses 120 allow a processing core 112 to access measurement data in neighbouring processing cores 112. Neighbouring processing cores 112 are associated with local patches 114 in the quantum computing layer 102 neighbouring the local patch 114 of the processing core 112 accessing the measurement data.

Referring also to FIG. 4, in some alternative embodiments, multiple processing cores 112 are located on each motherboard 136. Each processor core 112 comprises one or more processors 116 and a processor cache 118. The processor cores 112 on each motherboard 136 can exchange data via an intra-motherboard bus 138 (which in some embodiments can be in the form of an L3 cache). In the embodiment shown, the motherboard 136 is provided with four processor cores 112. However, fewer or more processor cores 112 can be used.

In the embodiment shown, processor cores 112 on the perimeter of the motherboard 126 each have directional busses 140 to their nearest neighbour processor cores on neighbouring motherboards. This can allow exchange of measurement data between processor caches of neighbouring processor cores on different motherboards.

Referring also to FIG. 5, an alternative to having each of the perimeter processor cores 112 having directional busses to nearest neighbour processor core on neighbouring motherboards is to have common directional busses 140 for the perimeter processors that are used as a shared resource. In this embodiment, the common directional busses 140 exchange data between processor caches on neighbouring motherboards. The common directional busses 130 can be connected with the intra-motherboard bus 138, allowing data from the caches of neighbouring motherboard processor cores to be used by any of the processor cores 112 on the motherboard 126.

Referring also to FIG. 6, additional processing can be provided in a second classical processing layer 134. The second classical processing layer comprises an array of second layer processing cores 136. The second layer processing cores 136 in the second classical processing layer 134 use the corrected parities and/or identified errors output by the classical processing layer 106 to determine instructions for correcting the identified quantum errors. The determined instructions 146 are transmitted to the control layer 104, which converts them to control signals and applies them to the quantum devices 108 in the quantum computing layer 102, thereby correcting the identified errors.

Typically the second processing layer 142 has fewer second layer processing cores 144 than the first classical processing layer 106 has processing cores 112. In some embodiments the second classical processing layer 142 has up to a factor of 100 fewer processing cores. The second classical processing layer 142 can also provide global quantum algorithm control.

The system described above is particularly suited for implementing a surface code to determine and correct quantum errors. An example of such a surface code is the Toric code.

In use, the quantum computing layer executes a quantum algorithm with a surface code being used for error correction. The surface code can be visualized as a large checkerboard. Each square represents a qubit. White squares correspond to qubits being used to store data, and are referred to as data qubits. Black squares correspond to qubits being used to check for errors in their neighbouring four data qubits, and are referred to as measurement or syndrome qubits. Computation is achieved by turning on and off regions of the surface code. Physically, this involves causing the measurement qubits to cease interacting with data qubits within specific regions of the quantum computing layer.

In this situation, the quantum algorithm can be visualized as a three-dimensional geometric structure, or array, with time running vertically. The execution of the algorithm can be visualized as operating in a two dimensional (for a one-dimensional array of qubits) or three dimensional (for a two-dimensional array of qubits) data structure, sometimes called the "space-time" or "volume". This data structure can be constructed from regular building blocks, which are referred to herein as "plumbing pieces". A stream of these plumbing pieces can be fed into control hardware and expanded into collections of physical quantum gates. These physical quantum gates can be converted into hardware-specific control signals for controlling the progress of the quantum algorithm.

FIG. 7 illustrates an example of processes performed in a quantum computer during execution of a quantum computing algorithm. During execution of the quantum algorithm, measurement qubits interact with their neighbouring data qubits in parallel within the quantum computing layer 102, and perform measurements of the data qubit quantum states 148. In some embodiments, during every cycle of checking a number of binary measurements equal to half the number of qubits in the quantum computer is generated. Rounds of measurements are performed sequentially in time.

The physical measurements of the data qubits by the measurement qubits are passed to the control layer 104 as readout signals 150. In the control layer, the readout signals 150 are converted into measurement data 152. The measurement data 152 are then transmitted to the classical processing cores in the first classical processing layer 106 corresponding to the local patch of quantum devices from which the measurement data 152 originated.

The first classical processing layer receives the measurement data and processes it to determine any errors in the execution of the quantum algorithm.

The first step is to convert the measurements to detection events. In some embodiments this is achieved by comparing each measurement at a location in the quantum computing layer with the previous measurement at the same location. When the measurement at a location differs from the previous measurement at that location a detection event is recorded at that location.

In the surface code, detection events correspond to the end points of chains of errors in the quantum algorithm. To determine possible error corresponding to the detection events, detection events are matched to each other to form pairs, or are matched to a boundary of the qubit array.

Matching of the detection events is performed in the first classical processing layer 106. Each classical processor core stores layered representations of the potential detection events that can occur in its corresponding local patch. In some embodiments, the layered representations comprise potential detection events that can occur during a round of error detection at stages of the quantum algorithm. Emanating from the potential detection events in each layer are a set of weighted lines connecting the detection event to other potential detection events. The weight of each line is representative of the probability of detection events at each end of the line occurring together as the result of an error. In some embodiments, the lines are weighted such that higher probability lines have a lower weight than lower probability lines.

The layered representation is pre-determined based on knowledge of the quantum algorithm and the possible errors that can occur during its execution. The layered representation is chosen such that the representation for each local patch fits into the processor cache of the corresponding processor core in the first classical computing layer.

As the quantum algorithm progresses, the layered representations are used to construct an array in each of the classical processing cores representing the progress of the algorithm. Horizontal slices of the array correspond to rounds of error detection measurements, as described hereinafter. The array representing a given local patch is cyclically written to the processor cache of the processor core associated with that local patch. Referring to FIG. 8, an example of such an array 156 will now be described. In the figure, time runs cyclically from left to right. As detection events 158 are determined in the array 156, the processor core attempts to match them to other determined detection events in the array using minimum weight perfect matching. The array is constructed from the relevant layers 160 of the layered representation (only some of which are labelled in FIG. 8) that correspond to the stages of the quantum algorithm that the quantum computer has passed through.

The instructions for each processor core to perform the minimum weight perfect matching are stored in the processor cache of that processor core. This allows for fast execution of the matching algorithm, as no external memory needs to be accessed. Matching the detection events results in a list of errors 162 that may have occurred in the execution of the quantum algorithm.

During matching of the detection events by a processor core, the processor core may require data relating to detection events in a local patch of devices neighbouring its own local patch. For example, if the processor is unable to match a detection event to another detection event in its local patch, it may be able to match it to a detection event in a neighbouring local patch. In these situations, the processor core can access the processor cache of a neighbouring processor core via the directional busses between them, as described above.

Using the matched detection events, the errors that resulted in them can be determined. The corresponding parity corrections can be determined from the errors, and are inserted into a representation of the space-time of the quantum algorithm. This can, in some embodiments, be a layered structure storing physical qubit level Pauli frame 154 information.

In some embodiments, the error list 162 is in the form of correlation surface parities. After matching, corrections are inserted in space-time in a classical simulation of the quantum computer, as described above. These corrections can be propagated forward in time through the quantum gates (which can be done efficiently) to determine the true value of the physical measurement results. Parities of corrected measurement results on correlation surfaces are then sent for higher-level processing.

In some embodiments, the corrected parities are passed to the second classical processing layer 142 for higher-level processing. The second classical processing layer 142 is used to determine future logical gates required in order to correct the quantum algorithm. The corrected parities 162 are converted into logical measurement results and logical by-product operators 164. The set of all logical by-product operators is called the logical Pauli frame. Given the logical Pauli frame and logical measurement results, the necessary corrective action to correct the quantum algorithm can be determined. The logical measurements and logical Pauli frame 164 comprise values of measurements of logical qubits, with results being 0 or 1, and the way in which unmeasured logical qubits differ from their ideal values. The differences can be represented as one of the I, X, Y, Z operators, each being a 2×2 matrix.

The second classical processing layer also provides global quantum algorithm control. Global quantum algorithm control can, in some embodiments, be implemented using the following features.

Logical measurement dependant logical Clifford+T circuit module 166. Quantum circuits are comprised of quantum gates. An example of such a type of gate is Clifford gates, which comprise initialization, measurement, I, X, Y, Z, CNOT, CZ, S, H operations and combinations thereof. A further example is a T gate. Quantum circuits are like software, with some future gates dependant of the value of intermediate measurements. The Logical measurement dependant logical Clifford+T circuit module 166 determines these logical measurement dependent future gates from the logical measurements. These can comprise future gates to implement the identified error correction determined by the first layer. Once a number of logical measurements have been obtained, the future gates of the quantum circuit can be determined. An increasing number of gates get known with confidence as computation proceeds and more logical measurements become available. The output of this module is a Logical Clifford+T circuit 168.

Topological skeleton plus state distillation factories module 170. The known part of the algorithm determined by the Logical measurement dependant logical Clifford+T circuit module 166 is converted into standard structures, referred to as the "topological skeleton", and factories for distilling ancilla quantum states for use in the quantum algorithm.

Skeleton, factories, and paths from factories to skeleton module 172. Given the Topological skeleton plus state distillation factories determined by the Topological skeleton plus state distillation factories module 170, logical measurements 164 can be used to determine which factories have succeeded in distilling an ancilla state. The paths required to connect these states to the topological skeleton where the output is needed are then determined.

Correlation surfaces module 174. The correlation surfaces are sets of measurements whose parities give a logical measurement result and/or generate a logical Pauli frame correction. A correlation surface indicates which parity of measurement results to examine to determine whether a logical X and/or Z by-product operators have been introduced into the computation. The correlation surfaces are determined from the output of the Skeleton, factories, and paths from factories to skeleton module 172. The correlation surfaces are output to the first classical computing layer 106 for use in determining parities from physical measurements.

Plumbing pieces module 176. The plumbing piece module converts the output of the Skeleton, factories, and paths from factories to skeleton module 172 into a set of plumbing pieces for implementing the required gates in the quantum computing layer 102. The plumbing piece module 176 outputs plumbing pieces to the control layer 104 for implementation in the quantum computing layer 102. The control layer converts these to physical gate operations 178. These are then output as control pulses 180 to gates in the quantum computing layer 102 in order to implement the quantum algorithm with the determined corrections.

The determined corrective actions are then output by the second classical processing layer to the control layer 104. There, physical gates convert the determined corrective actions into control pulses. The control pulses are used to implement the corrective action on qubits in the quantum computing layer 102.

Implementations of the quantum subject matter and quantum operations described in this specification may be implemented in suitable quantum circuitry or, more generally, quantum computational systems, including the structures disclosed in this specification and their structural equivalents, or in combinations of one or more of them. The term "quantum computational systems" may include, but is not limited to, quantum computers, quantum information processing systems, quantum cryptography systems, or quantum simulators.

The terms quantum information and quantum data refer to information or data that is carried by, held or stored in quantum systems, where the smallest non-trivial system is a qubit, e.g., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Quantum circuit elements may be used to perform quantum processing operations. That is, the quantum circuit elements may be configured to make use of quantum-mechanical phenomena, such as superposition and entanglement, to perform operations on data in a non-deterministic manner. Certain quantum circuit elements, such as qubits, may be configured to represent and operate on information in more than one state simultaneously. Examples of superconducting quantum circuit elements that may be formed with the processes disclosed herein include circuit elements such as co-planar waveguides, quantum LC oscillators, qubits (e.g., flux qubits or charge qubits), superconducting quantum interference devices (SQUIDs) (e.g., RF-SQUID or DCSQUID), inductors, capacitors, transmission lines, ground planes, among others.

In contrast, classical circuit elements generally process data in a deterministic manner. Classical circuit elements may be configured to collectively carry out instructions of a computer program by performing basic arithmetical, logical, and/or input/output operations on data, in which the data is represented in analogue or digital form. In some implementations, classical circuit elements may be used to transmit data to and/or receive data from the quantum circuit elements through electrical or electromagnetic connections. Examples of classical circuit elements that may be formed with the processes disclosed herein include rapid single flux quantum (RSFQ) devices, reciprocal quantum logic (RQL) devices and ERSFQ devices, which are an energy-efficient version of RSFQ that does not use bias resistors. Other classical circuit elements may be formed with the processes disclosed herein as well.

During operation of a quantum computational system that uses superconducting quantum circuit elements and/or superconducting classical circuit elements, such as the circuit elements described herein, the superconducting circuit elements are cooled down within a cryostat to temperatures that allow a superconductor material to exhibit superconducting properties.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. For example, the actions recited in the claims can be performed in a different order and still achieve desirable results. In certain circumstances, multitasking and parallel processing may be advantageous. Moreover, the separation of various components in the implementations described above should not be understood as requiring such separation in all implementations.

A number of implementations have been described. Nevertheless, it will be understood that various modifications may be made without departing from the spirit and scope of the invention. Other implementations are within the scope of the following claims.

The invention claimed is:

1. A computer-implemented method comprising:
receiving, by a classical processing layer comprising an array of processing cores, measurement data from a quantum computing layer, wherein each processing core in the array of processing cores receives measurement data from a local patch of quantum devices in the quantum computing layer;
identifying, by the classical processing layer, a plurality of detection events in the measurement data;
matching, by the classical processing layer, a detection event to another detection event to form a matched pair, the matching comprising
  i) attempting, by a processor core associated with the local patch containing the detection event, to match the detection event to a detection event in the same local patch, and
  ii) if the processor core is unable to match a detection event to another detection event in the same local patch, accessing a processor cache of a neighbouring processor core and attempting to match the detection event to a detection event in a neighbouring local patch corresponding to the neighbouring processor core; and
determining one or more errors in the quantum computing algorithm performed by the quantum computing layer using the matched pair.

2. The method of claim 1, further comprising:
receiving, by a control layer comprising an array of field programmable gated arrays, physical measurements from the quantum computing layer;
converting, by the control layer, the physical measurements to measurement data; and
outputting, by the control layer, the measurement data to the classical processing layer.

3. The method of claim 2, further comprising:
receiving, by the control layer, quantum error correction instructions; and
in response to receiving the quantum error correction instructions, causing, by the control layer, implementation of one or more qubit rotations on the quantum computing layer.

4. The method of claim 1, further comprising determining, by the classical processing layer, corrected parities of quantum devices in the quantum computing layer.

5. The method of claim 4, further comprising:
receiving, by a second classical processing layer, one or more corrected parities of quantum devices in the quantum computing layer from the classical processing layer; and
determining, by the second classical processing layer, one or more quantum error correction instructions from one or more determined errors corrected parities.

6. The method of claim 5, further comprising causing, by the second classical processing layer, implementations of the one or more quantum error correction instructions in the quantum computing layer.

7. The method of claim 5, further comprising implementing, by the second classical processing layer, a surface code to determine the one or more quantum error correction instructions.

* * * * *